US006843646B2

(12) United States Patent
Ryan et al.

(10) Patent No.: US 6,843,646 B2
(45) Date of Patent: Jan. 18, 2005

(54) NICKEL BLOW MOLD AND HOLDER DEFINING HEAT TRANSFER PASSAGES THEREBETWEEN

(75) Inventors: Michael J. Ryan, Aurora (CA); Reinhart Weber, Penetanguishene (CA)

(73) Assignees: Sig Ryka Inc., Mississauga (CA); Weber Manufacturing Limited, Midland (CA)

( * ) Notice: Subject to any disclaimer, the term of this patent is extended or adjusted under 35 U.S.C. 154(b) by 297 days.

(21) Appl. No.: 10/045,567

(22) Filed: Oct. 19, 2001

(65) Prior Publication Data

US 2003/0077351 A1 Apr. 24, 2003

(51) Int. Cl.[7] ............................ B29C 49/48; B29C 49/64
(52) U.S. Cl. ..................... 425/195; 249/79; 249/102; 425/522; 425/526
(58) Field of Search ............................ 425/522, 526, 425/195; 249/79, 102

(56) References Cited

U.S. PATENT DOCUMENTS

| 2,790,994 | A | | 5/1957 | Cardot et al. | |
|---|---|---|---|---|---|
| 3,097,398 | A | * | 7/1963 | Inglesby | 425/170 |
| 3,249,672 | A | | 5/1966 | Richards et al. | 264/219 |
| 3,380,121 | A | * | 4/1968 | Chittenden et al. | 264/526 |
| 3,768,948 | A | | 10/1973 | Horberg, Jr. et al. | |
| 3,784,344 | A | * | 1/1974 | Korsch | 425/526 |
| 4,072,456 | A | | 2/1978 | Appel et al. | |
| 4,087,227 | A | * | 5/1978 | Uhlig | 425/526 |
| 4,872,827 | A | * | 10/1989 | Noda | 425/526 |
| 4,962,555 | A | * | 10/1990 | Nakamura | 12/147 R |
| 5,169,549 | A | | 12/1992 | Weber | 249/80 |
| 5,407,487 | A | | 4/1995 | Weber et al. | 118/728 |
| 5,750,160 | A | | 5/1998 | Weber et al. | 425/290 |
| 5,766,299 | A | * | 6/1998 | Miller | 425/526 |
| 5,968,560 | A | * | 10/1999 | Briere et al. | 425/192 R |

FOREIGN PATENT DOCUMENTS

| GB | 2 240 300 A | | 7/1991 | |
|---|---|---|---|---|
| JP | 05112887 A | * | 5/1993 | C25D/1/08 |

OTHER PUBLICATIONS

Patent Abstracts of Japan, 11 300 748 published Nov. 2, 1999.

* cited by examiner

*Primary Examiner*—Robert B. Davis
(74) *Attorney, Agent, or Firm*—Ridout & Maybee LLP

(57) ABSTRACT

An air cooled or heated blow mold is shown having a mold cavity shell and a mold holder. The mold cavity shell is made by a process of nickel vapour deposition and so requires no hand finishing or polishing. The mold cavity shell has a cavity portion with a front face defining a cavity in the shape of a portion of a product to be molded. The mold holder is located rearwardly of the mold cavity shell and defines an inner wall spaced from the mold cavity shell cavity portion to define a heat transfer passage between the inner wall and the cavity portion. In use, air is passed through the heat transfer passage to transfer heat to or from the mold cavity shell.

11 Claims, 9 Drawing Sheets

NICKEL BLOW MOLD AND HOLDER DEFINING HEAT TRANSFER PASSAGES THEREBETWEEN

FIELD OF INVENTION

The present invention relates to blow molds, and in particular to air cooled blow molds.

BACKGROUND OF THE INVENTION

Producing plastic products by blow molding is well known. One way of doing this is to provide mating mold halves having shells defining the shape of the desired product to be molded nested within mold holders. A parison is provided inside the mold halves and air is then introduced into the parison to expand it to conform to the shape defined by the mold shells. Upon cooling to a suitable temperature, the molded product is then removed from the blow mold and thereafter, employed in its desired capacity.

Molds are normally made of aluminium. The mold surfaces, which define the shape of the product to be blown, require machining and hand finishing or polishing in order to produce a desired surface finish. Even when the mold surface has been machined, it is difficult to create fine detail which will be easily reproduced in the subsequent blown product. An example of this fine detail desired would be a very small symbol indicating the product is made of recycled plastic, or intricate designs indicating the proprietor's trade-mark. This machining and polishing requirement, apart from being complicated, makes it expensive to produce the molds.

The blow molding process requires that the blow mold unit be cooled or heated to suit the process. Until the blow mold unit has been sufficiently cooled or heated, the blown product cannot be removed. Pre-mature removal of the blown product is likely to result in deformation of its shape which in turn, may affect its commercial applicability as well as its aesthetic appeal. Such cooling or heating is normally accomplished by introducing cold or hot liquid respectively, through a network of heat transfer passages that are machined into the molds. Again, this makes the molds complex, and expensive to produce.

An example of a liquid cooled mold is shown in U.S. Pat. No. 3,768,948, issued to *Horberger Jr. et al*. This patent shows a blow mold consisting of a carrier and a shell, the shell having fins on its back surface extending toward the carrier, and fin channels provided by the carrier, thus creating a complex fluid cooling network for passage of heat transfer fluid therethrough. The precision manufacture required for the shell and carrier combinations of this nature is expensive. Proper alignment and cooperation of the fins and fin channels in manufacture is also complex.

Other examples of liquid cooled molds produced in the past are shown in U.S. Pat. No. 4,072,456 issued to Appel et al. and U.K. Pat. No. 2,240,300 issued to Hanna et al. Again, the molds are complex and expensive to produce.

SUMMARY OF THE INVENTION

The present invention alleviates some of the above mentioned difficulties as well as others. The present invention provides a mold of simple construction having a nickel vapour deposited nickel cavity shell requiring no hand finishing, and provides for a simple method of cooling or heating.

According to the invention, there is provided a mold assembly for use in a plastic blow mold. The mold assembly comprises a mold cavity shell made by nickel vapour deposition (NVD). The mold cavity shell has a cavity portion including a front face, a rear face and peripheral edge portions. The front face defines a cavity in the shape of a portion of a product to be molded. The mold has coplanar peripheral side portions attached to the peripheral edge portions, the side portions defining front surfaces adapted to mate with corresponding surfaces of a mating mold cavity shell to define the product to be molded. A mold holder is located rearwardly of the mold cavity shell. Means are provided for releasably connecting the mold holder to the peripheral side portions. Also, the mold holder defines an inner wall spaced from the mold cavity portion to define a heat transfer passage between the inner wall and the cavity portion.

BRIEF DESCRIPTION OF THE DRAWINGS

Preferred embodiments of the invention will now be described, by way of example, with reference to the accompanying drawings, in which.

BRIEF DESCRIPTION OF THE DRAWINGS

Figure 1:
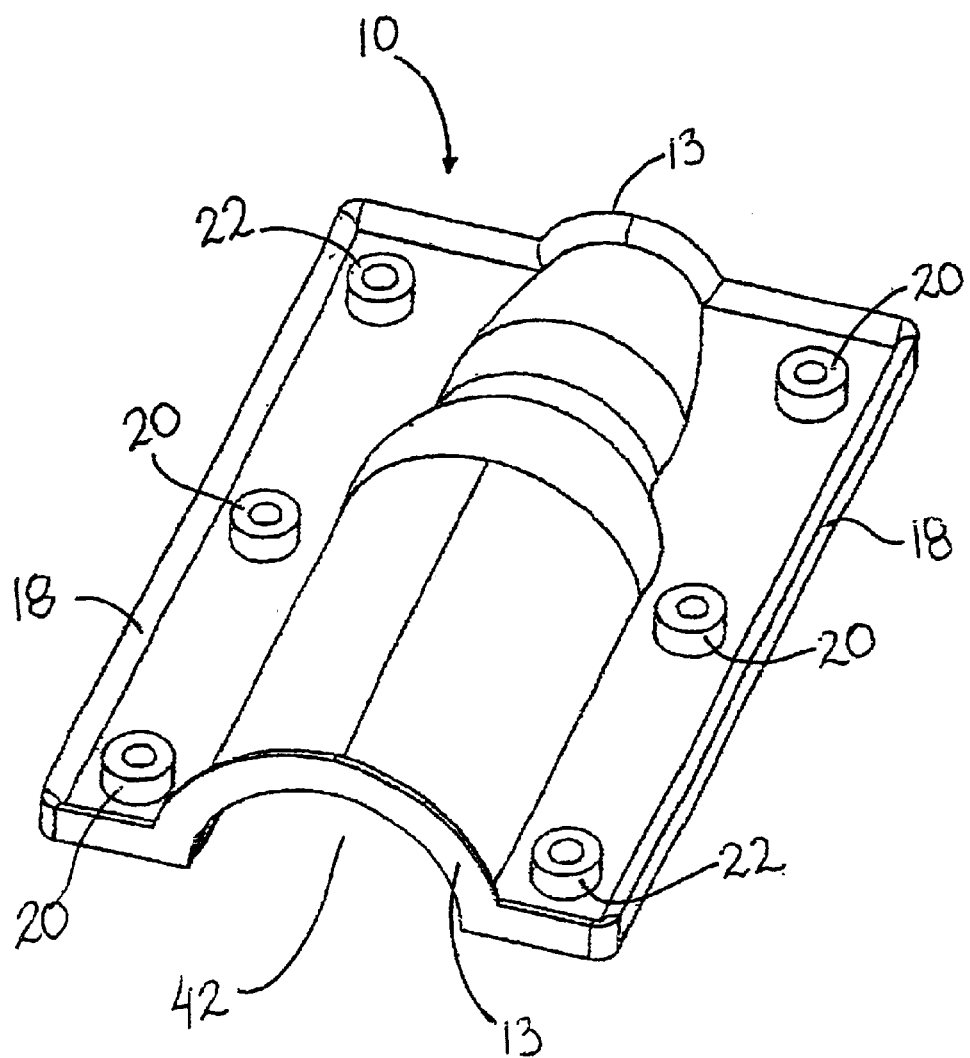
FIG. 1 is a perspective view of the rear face of a preferred embodiment of a mold cavity shell according to the present invention.
Figure 2:
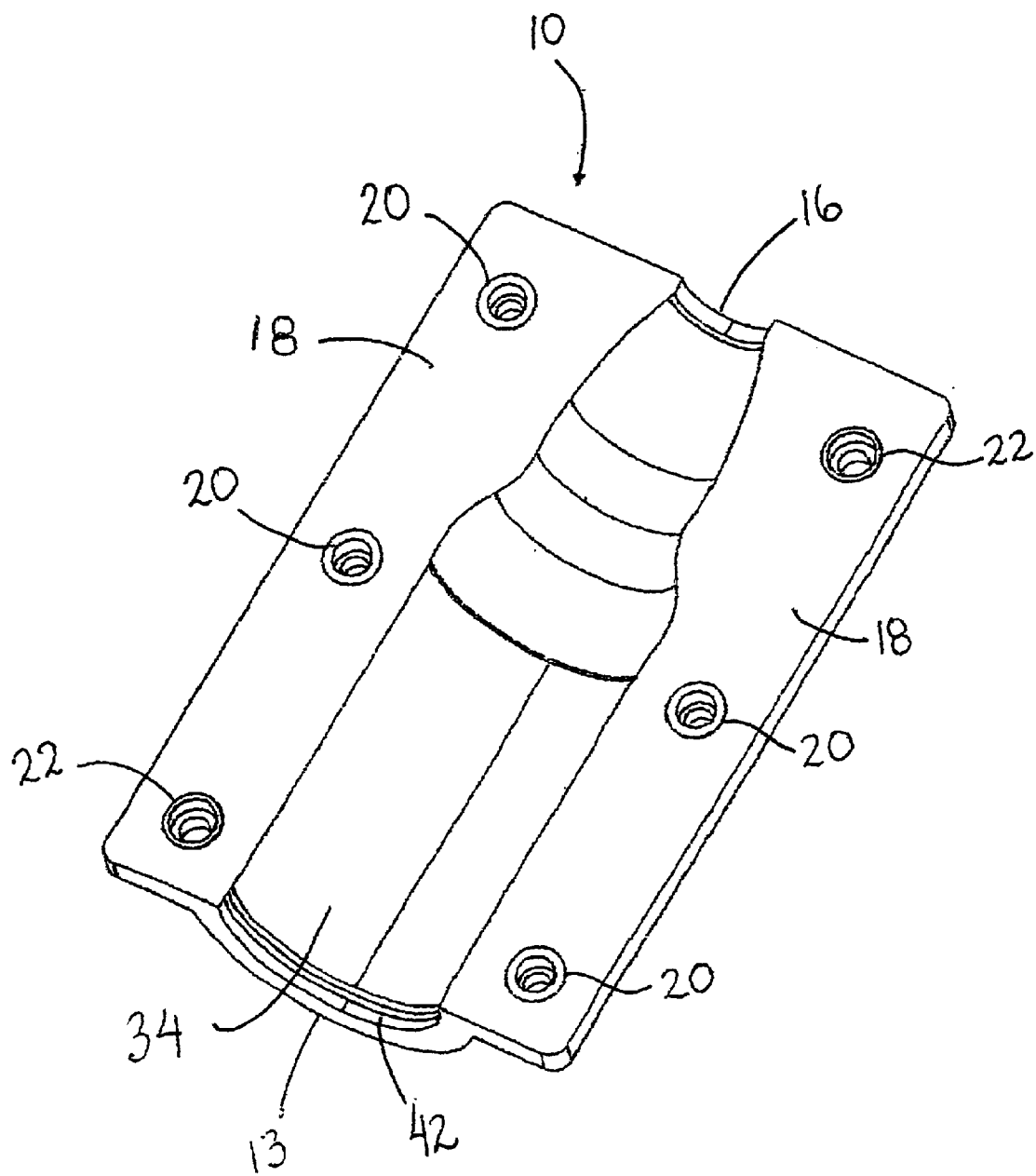
FIG. 2 is a perspective view of the front face of the mold cavity shell shown in FIG. 1.
Figure 3:
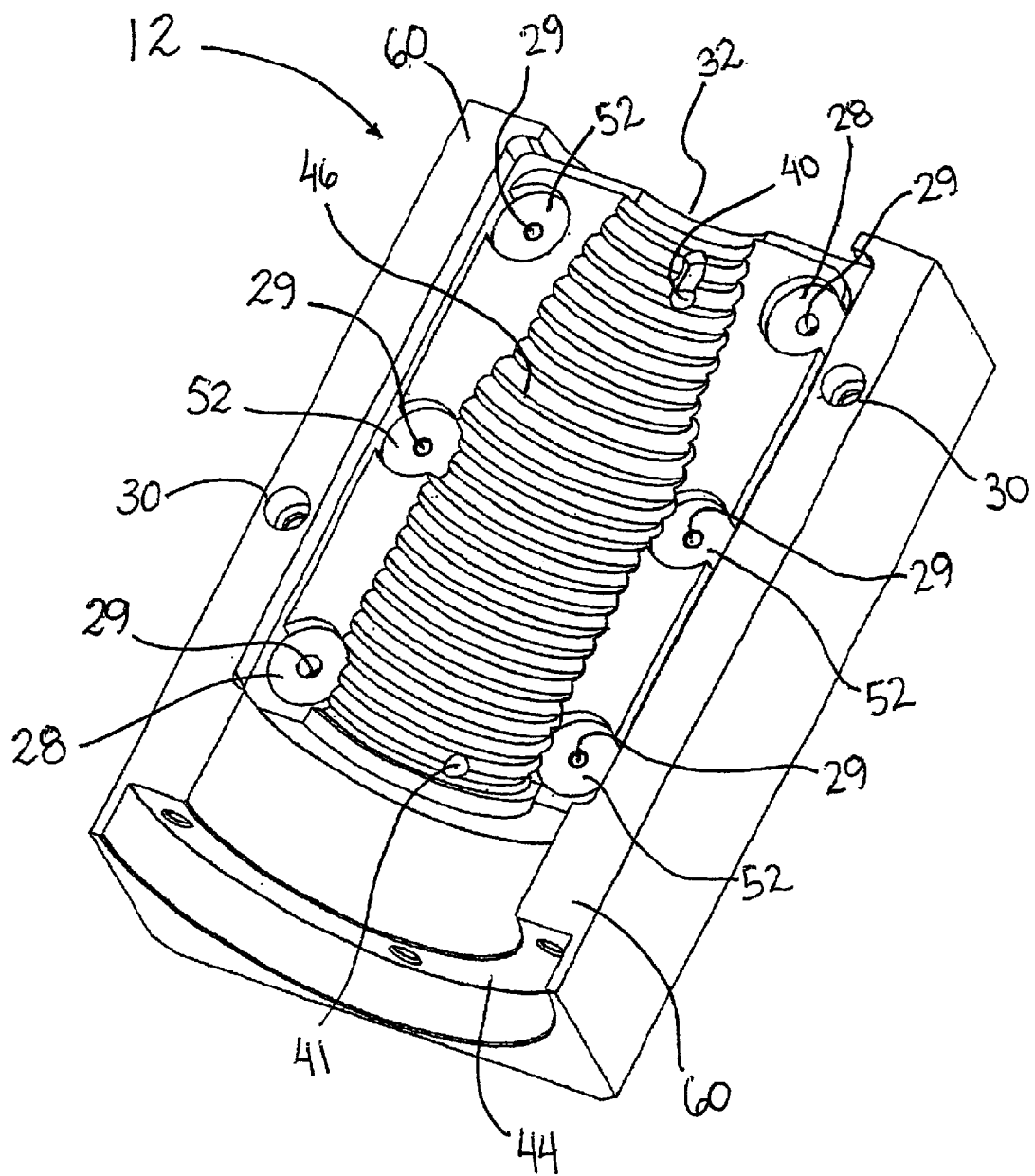
FIG. 3 is a perspective view of a preferred embodiment of a mold holder according to the present invention.
Figure 8:
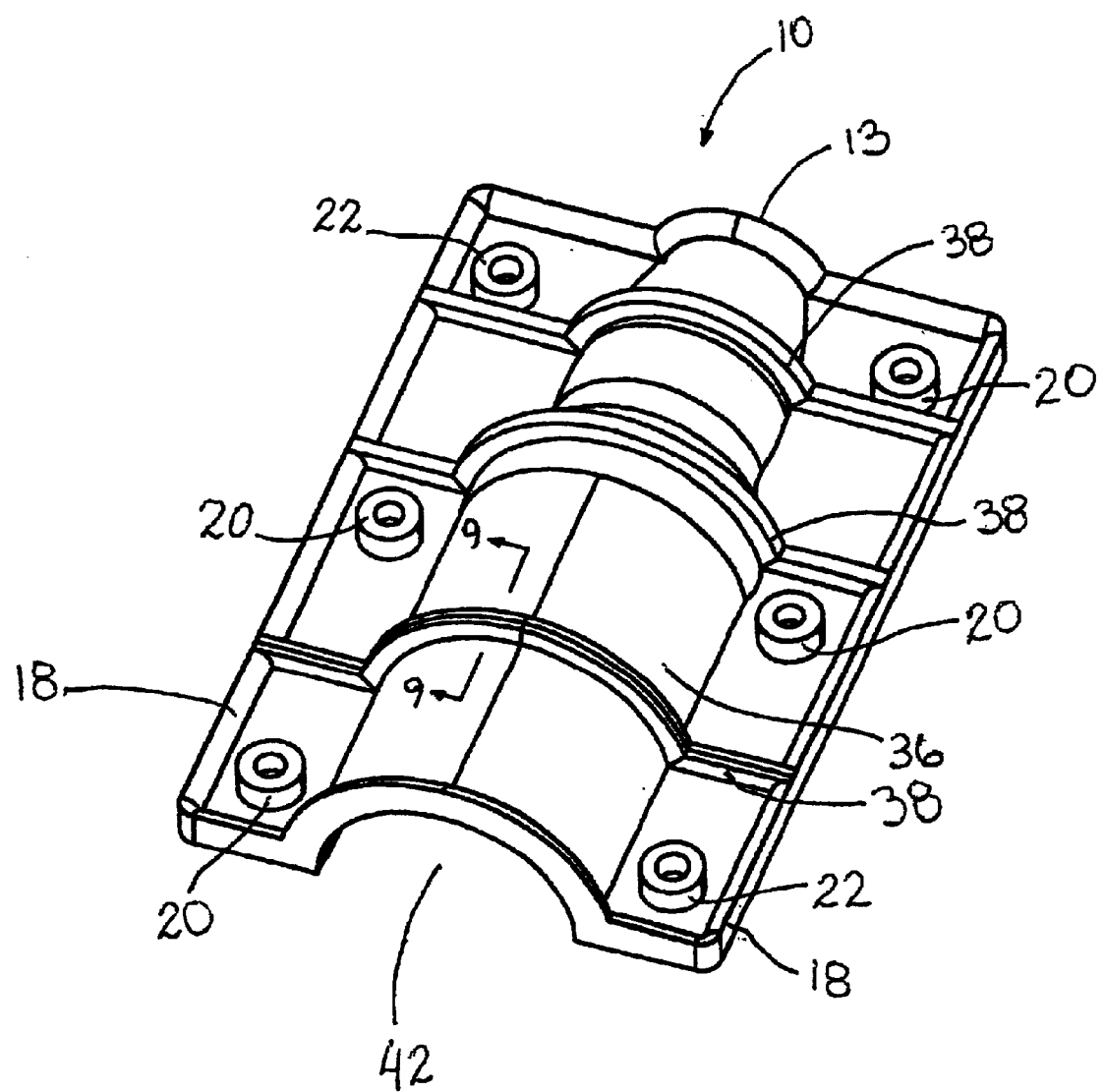
FIG. 8 is a perspective view similar to FIG. 1 but showing another preferred embodiment of a mold cavity shell according to the present invention.

Referring to the drawings, a preferred embodiment of a mold cavity shell according to the present invention is generally indicated by reference numeral 10. Mold cavity shell 10 fits into a mold holder 12 (see FIG. 3) and together they form a "blow mold unit". The mold cavity shell 10 is made by any conventional nickel vapour deposition (NVD) process. The thickness of mold cavity shell 10 can be varied, depending upon considerations of cost and utility. Increasing the thickness of mold cavity shell 10 increases its resistance to stress and deformation, but increases cost as well. The thickness of mold cavity shell 10 typically ranges from 0.078–0.39 inches (2–10 millimetres). An alternative to increasing the thickness of the mold cavity shell 10 (to improve resistance to stress and deformation) is to provide structural enhancement ribs 38 (see FIG. 8) on the rear face 36 of the mold cavity shell 10 (as will be further discussed below).

Mold holder 12 is preferably made of aluminium. The mold cavity shell 10 has a cavity portion 13 which defines a cavity 34 in the partial shape of an object to be molded.

Figure 4:
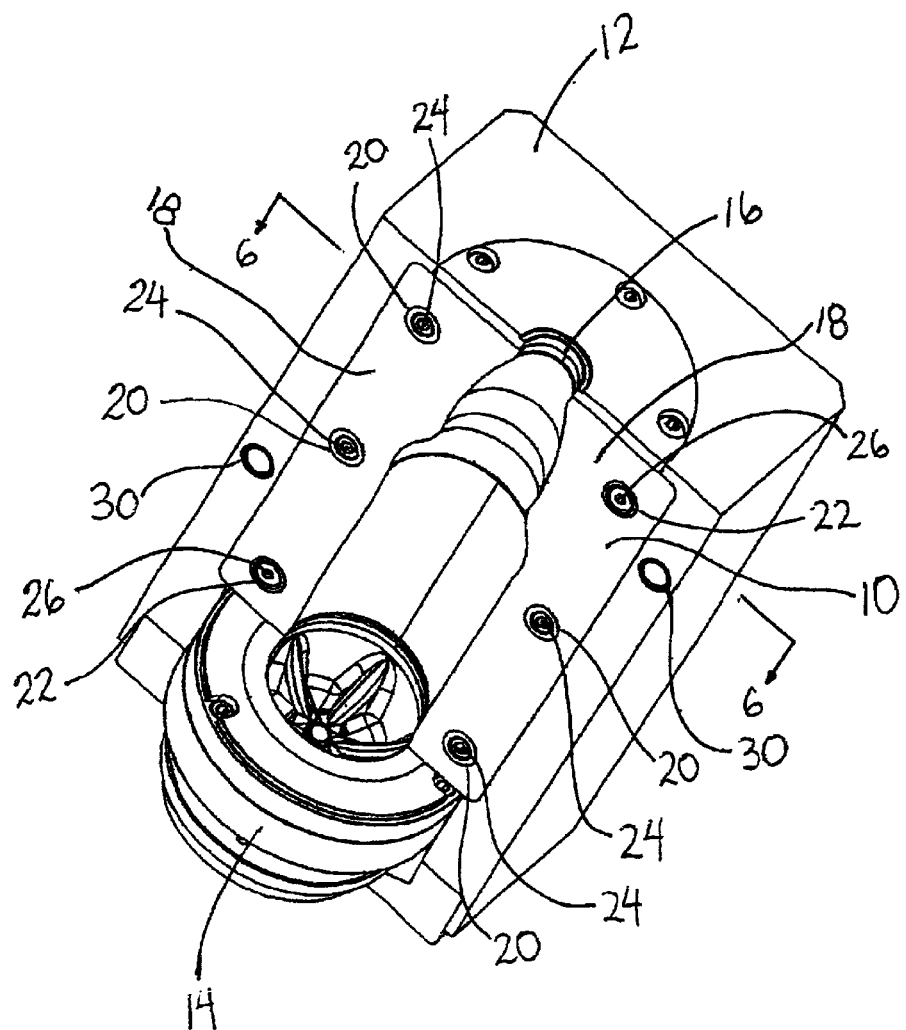
FIG. 4 is a perspective view of the mold cavity shell of FIG. 1 mounted in the mold holder of FIG. 3, with the addition of a mold cavity bottom.

When mold cavity shell 10 is mated to a corresponding mold cavity shell 10, the entire shape of the object to be molded is defined, although such an object may also include a mold cavity bottom 14 as indicated in FIG. 4. The mold cavity shell 10 having been produced by the NVD process provides a smooth and detailed cavity 34 which requires no machining or hand finishing.

In defining the cavity 34, the mold cavity shell 10 also defines a first opening 16 communicating with the cavity 34 to receive a preform or parison (not shown) for blow molding, and a second opening 42 to receive a mold container bottom 14 for creating objects such as plastic bottles (not shown).

The mold cavity shell 10 has peripheral side portions 18 circumscribing the cavity portion 13.

The mold cavity shell 10 also includes locating registering means 22 and locating clamping means 20. These locating registering means 22 can for example, be in the form of bushings. These bushings can be encapsulated into the mold cavity shell 10 during the NVD process, and may be threaded. Locating registering means 22 are used to accurately align the mold cavity shell 10 with mold holder 12 by engaging holder guiding recesses 28 which include openings 20 to receive threaded fasteners, as described further below. Similarly, the locating clamping means 20 engage holder securing means or recesses 52 when the mold cavity shell 10 is properly aligned with the mold holder 12.

The mold holder 12 defines a recess 32 on its front face. The recess 32 is designed to receive the rear face 36 of the mold cavity shell 10 such that a heat transfer passage 39 is formed therebetween for air flow for cooling or heating mold cavity portion 13. Recess 32 also includes an air inlet(s) 40 and air outlet(s) 41 to allow for the entry and exit of air in the heat transfer passages 39. Similarly, the mold cavity bottom 14 can also have an air inlet(s) (43) and air outlet(s) (not shown).

Figure 9:
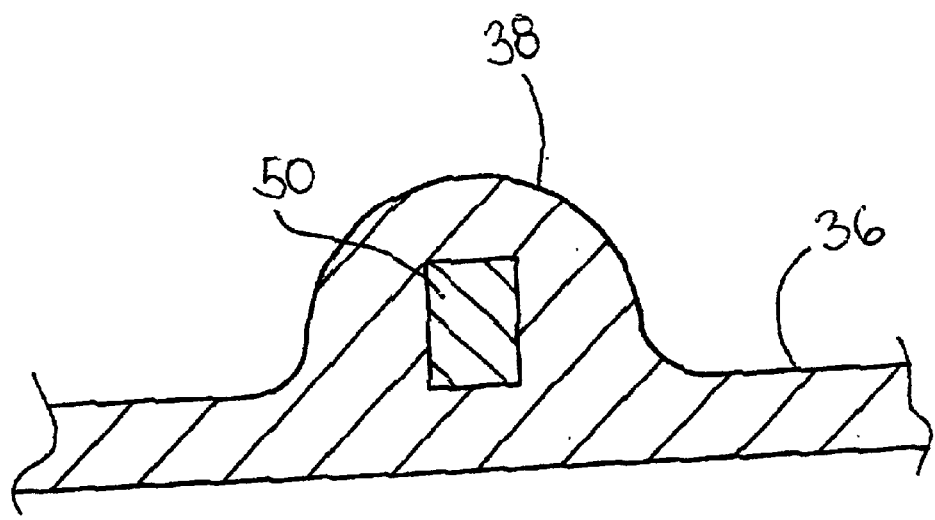
FIG. 9 is a cross-sectional view taken along lines 9—9 of FIG. 8.

One embodiment of the invention allows for the inclusion of structural enhancement ribs 38 (see FIG. 8) on the rear face 36 of the mold cavity shell 10 that nest within the corresponding mold holder recess 32. Such structural enhancement ribs can be in the form of parallel ribs 38. These ribs can be made of steel bars 50 (see FIG. 9) attached to the rear face 36 by the NVD process. The addition of ribs 38 improves the strength of the mold cavity shell 10. Other patterns of structural enhancement ribs 38 are possible. The structural enhancement ribs 38 are designed so that air can still pass between the rear face of the mold shell 36 and the mold holder recess 32 for even cooling or heating.

Air cooling or heating in recess 32 can be improved by creating flow enhancement surface irregularities such as grooves 46 on the surface of recess 32. Other patterns of flow enhancement surface irregularities are possible.

Figure 6:
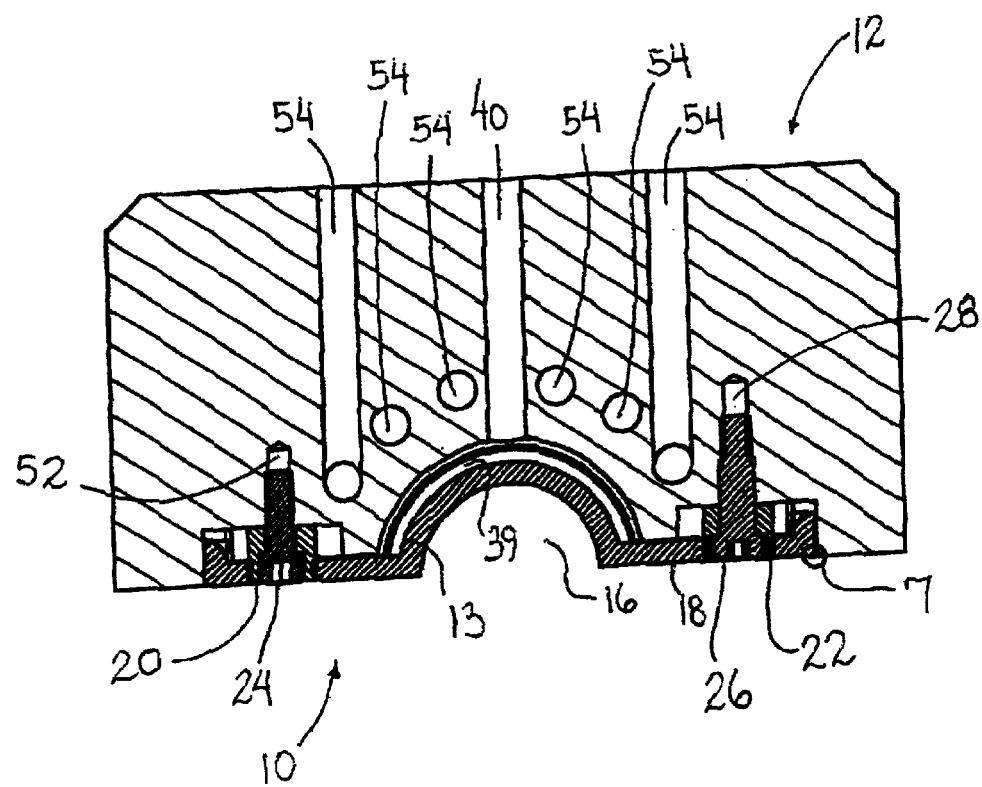
FIG. 6 is a cross-section view taken along the lines 6—6 in FIG. 4, modified to show an optional liquid heat transfer passage in the mold holder.

In an alternate embodiment of the invention, the mold holder 12 can be equipped to receive liquid cooling or heating (heat transfer) passages 54 (see FIG. 6) to further accelerate cooling or heating of the blow mold unit. Such liquid heat transfer passages would allow a liquid to enter through one end of a liquid heat transfer passage 54 and exit the other end. The passage of liquid through passage 54 would allow the mold holder 12 to cool or heat the air in heat transfer passage 39.

In use, mold cavity shell 10 is matingly engaged to mold holder 12 by aligning the rear face 36 of the mold cavity shell 10 with the defined recess 32 of the mold holder 12. The alignment is facilitated by locating registering means 22 on mold cavity shell 10 engaging holder guiding means 28 on mold holder 12. Once properly located, a socket head shoulder screw 26 can then be used to maintain correct alignment by passing the socket head shoulder screw 26 through both the locating registering means 22 and the holder guiding means 28. To further secure mold cavity shell 10 to mold holder 12, socket head cap screws 24 can be passed through locating clamping means 20 and holder securing means 52. Holder securing means 52 and holder guiding means 28 can be threaded to ensure the socket head cap screws 24 and socket head shoulder screws 26 respectively, are securely received. In the instance of blow molding a bottle (not shown), a mold cavity bottom 14 can be similarly aligned and securely received at the mold holder bottom 44.

Figure 5:
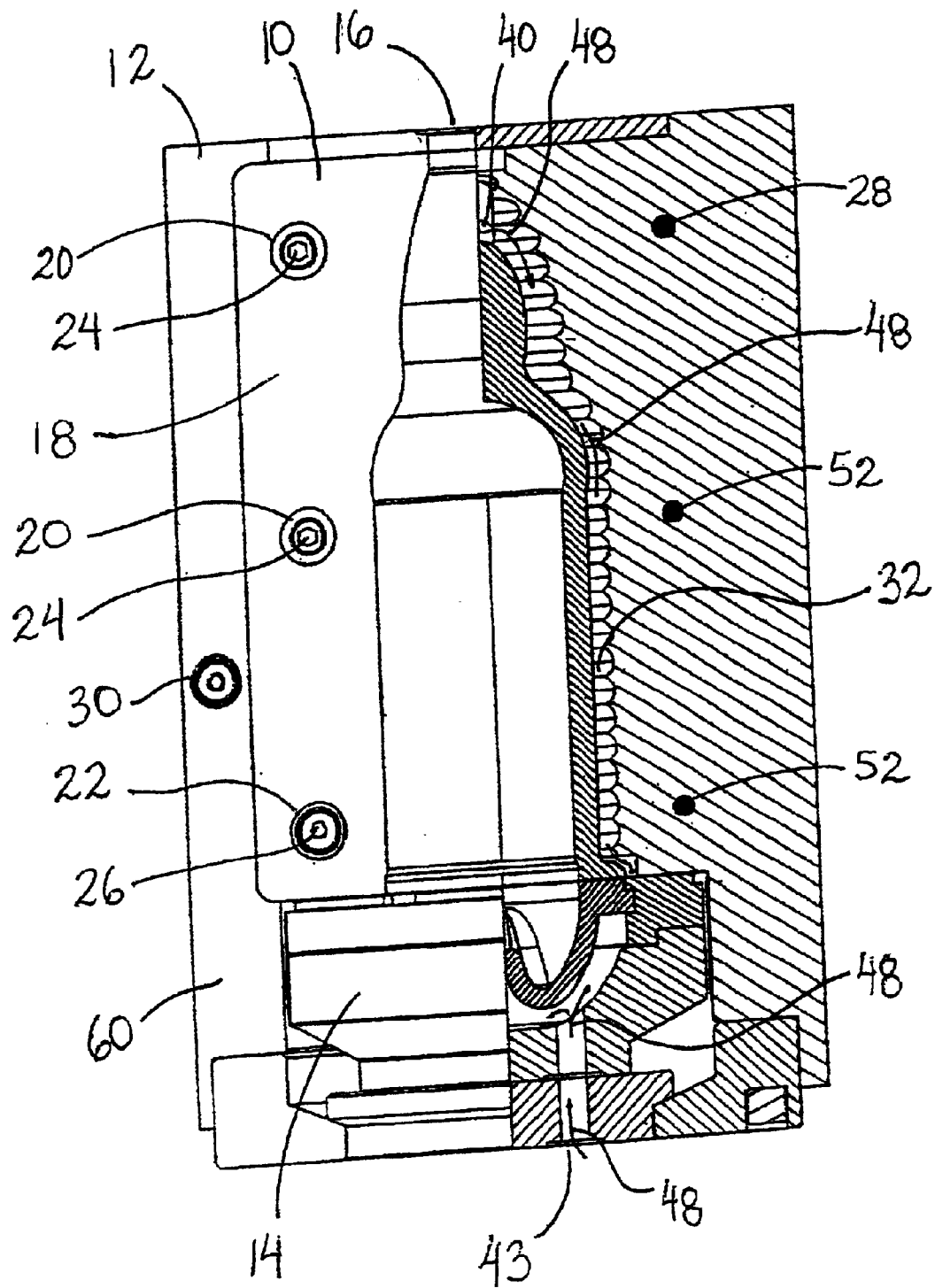
FIG. 5 is an elevational view of the mold components of FIG. 4, with the right side shown in cross-section.
Figure 7:
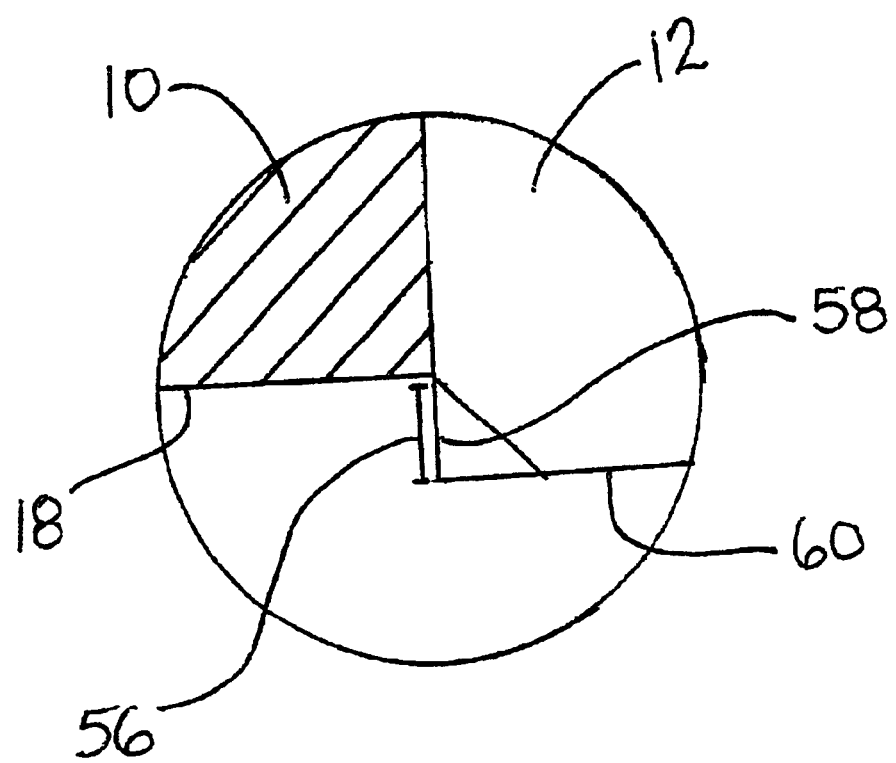
FIG. 7 is an enlarged scrap view of the portion of FIG. 6 identified by circle 7.

To form a complete mold, a second corresponding blow mold unit comprised of a mold cavity shell 10 nested within a mold holder 12 is then matingly joined to the first blow mold unit described above. The first mold holder 12 can be accurately aligned with the second mold holder 12 by aligning holder peripheral guiding means 30 of the first mold holder 12 with the second. As seen in FIGS. 5 and 7, mold holder edge portions 60 extend outwardly of the mold cavity shell peripheral side portions 18, as indicated by extension 58 in FIG. 7. When one mold cavity shell 10 is cooperatively engaged with a second mold cavity shell 10, extensions 58, if present, prevent the mold cavity shells 10, 10 from being sealingly engaged, thus creating a slight air space between the mold cavity shells 10, 10. This air space allows excess air in the mold cavity shells 10, 10 to escape when a parison (not shown) is being blown. Generally, the extensions 58 extend forward of the peripheral side portion 18 a distance 56 of between 0.002 and 0.003 inches (0.051 and 0.076 millimetres) thus creating a gap of total distance between 0.004 and 0.006 inches (0.102 and 0.152 millimetres) between the mated mold cavity shells 10, 10. The slight air pocket that results between the mold cavity shells 10, 10 will allow air to escape during the blow molding process. If extensions 58 are not present, then mold cavity shells 10, 10 will sealingly engage each other.

Once the blow mold unit is assembled, it is attached to a blow molding machine (not shown), several types of which are already well known in the art. If the mold holder 12 is equipped for liquid cooling or heating, the appropriate liquid cooling or heating lines (not shown) are then also attached to the mold holder 12 at the liquid heat transfer passage 54.

A parison (not shown) is introduced into the mold cavity shell opening 16. Air injected by the blow molding machine resulting in expansion of the parison to fill and conform to the shape of the cavity 34 of the mold cavity shells 10, 10. Where the peripheral edge portions 60 of the mold holder 12 include extensions 58, a slight gap for air flow is created between the mated mold cavity shells 10, 10, thus allowing excess air in cavity 34 to escape.

During the blow molding process, the surfaces of the mold cavity shells 34 are susceptible to temperature change. Cooling or heating of the blow mold unit is necessary before the finished product can be removed properly. Cooling or heating occurs by entry of air through the air inlet(s) 40, which circulates between rear face 36 and recess 32, and exits through the air outlet(s) 41. The typical direction of air flow is indicated by the arrows 48 in FIG. 5. If structural enhancement ribs 38 or flow enhancement surface irregularities (for example, in the form of grooves 46) are present, cooling or heating time can be improved. Cooling or heating time can be further improved by implementing liquid cooling or heating, if mold holder 12 is adapted to do so. This is accomplished by connecting liquid heat transfer means (not shown) to the liquid heat transfer passage 54 to pass liquid through passage 54.

As will be apparent to those skilled in the art in the light of the foregoing disclosure, many alterations and modifications are possible in the practice of this invention without departing from the spirit or scope thereof. The foregoing description is of the preferred embodiments and is by way of example only, and it is not to limit the scope of the invention.

What is claimed is:

1. A mold assembly for use in a plastic blow molding process, the mold assembly comprising:
   a mold cavity shell made by nickel vapour deposition;
   the mold cavity shell having a cavity portion including a front face, a rear face and peripheral edge portions, the front face defining a cavity in the shape of a portion of a product to be molded;
   the mold cavity shell also having coplanar, peripheral side portions attached to said peripheral edge portions, the side portions defining front surfaces adapted to mate with corresponding surfaces of a mating mold cavity shell to define the product to be molded;
   a mold holder located rearwardly of the mold cavity shell;
   means for releasably connecting the mold holder to the peripheral side portions; and
   the mold holder defining an inner wall spaced from the rear face of the mold cavity portion to define a heat transfer passage between said inner wall and said cavity portion, the mold holder inner wall being formed with flow enhancement surface irregularities in the form of a series of parallel grooves.

2. A mold assembly for use in a plastic blow molding process, the mold assembly comprising:
   a mold cavity shell made by nickel vapour deposition;
   the mold cavity shell having a cavity portion including a front face, a rear face and peripheral edge portions, the front face defining a cavity in the shape of a portion of a product to be molded, the rear face being formed with structural enhancement ribs in the form of a series of parallel spaced apart ribs;
   the mold cavity shell also having coplanar, peripheral side portions attached to said peripheral edge portions, the side portions defining front surfaces adapted to mate with corresponding surfaces of a mating mold cavity shell to define the product to be molded;
   a mold holder located rearwardly of the mold cavity shell;
   means for releasably connecting the mold holder to the peripheral side portions; and
   the mold holder defining an inner wall spaced from the rear face of the mold cavity portion to define a heat transfer passage between said inner wall and said cavity portion.

3. A mold assembly for use in a plastic blow molding process, the mold assembly comprising:
   a mold cavity shell made by nickel vapour deposition;
   the mold cavity shell having a cavity portion including a front face, a rear face and peripheral edge portions, the front face defining a cavity in the shape of a portion of a product to be molded;
   the mold cavity shell also having coplanar, peripheral side portions attached to said peripheral edge portions, the side portions defining front surfaces adapted to mate with corresponding surfaces of a mating mold cavity shell to define the product to be molded;
   a mold holder located rearwardly of the mold cavity shell, the mold holder having peripheral parting line portions located outwardly of the mold cavity shell peripheral side portions, the mold holder peripheral parting line portions having front faces extending slightly forwardly of the mold cavity shell side portion front surfaces;
   means for releasably connecting the mold holder to the peripheral side portions;
   and the mold holder defining an inner wall spaced from the rear face of the mold cavity portion to define a heat transfer passage between said inner wall and said cavity portion.

4. A mold assembly as claimed in claim 3 wherein the front faces extend forwardly a distance of between 0.002 and 0.003 inches (0.051 and 0.076 millimeteres) so that when the mold assembly is mated to a corresponding mating mold assembly, a gap of between 0.004 and 0.006 inches (0.102 and 0.152 millimetres) is present between the mating mold cavity shell side portion front surfaces.

5. A mold assembly for use in a plastic blow molding process, the mold assembly comprising:
   a mold cavity shell made by nickel vapour deposition;
   the mold cavity shell having a cavity portion including a front face, a rear face and peripheral edge portions, the front face defining a cavity in the shape of a portion of a product to be molded;
   the mold cavity shell also having coplanar, peripheral side portions attached to said peripheral edge portions, the side portions defining front surfaces adapted to mate with corresponding surfaces of a mating mold cavity shell to define the product to be molded;
   a mold holder located rearwardly of the mold cavity shell;
   means for releasably connecting the mold holder to the peripheral side portions;
   the mold holder defining an inner wall spaced from the rear face of the mold cavity portion to define a heat transfer passage between said inner wall and said cavity portion; and the peripheral side portions having locating registering means and the mold holder having corresponding locating registering means adapted to receive the peripheral side portion locating registering means.

6. A mold assembly as claimed in claim 5 wherein the peripheral side portion locating registering means and the mold holder locating registering means are adapted to receive a threaded fastener.

7. A mold assembly for use in a plastic blow molding process, the mold assembly comprising:
   a mold cavity shell made by nickel vapour deposition;
   the mold cavity shell having a cavity portion including a front face, a rear face and peripheral edge portions, the front face defining a cavity in the shape of a portion of a product to be molded;
   the mold cavity shell also having coplanar, peripheral side portions attached to said peripheral edge portions, the side portions defining front surfaces adapted to mate with corresponding surfaces of a mating mold cavity shell to define the product to be molded;
   a mold holder located rearwardly of the mold cavity shell;
   means for releasably connecting the mold holder to the peripheral side portions;
   the mold holder defining an inner wall spaced from the mold cavity portion to define a heat transfer passage between said inner wall and said cavity portion; and
   wherein the mold holder inner wall is formed with flow enhancement surface irregularities in the form of a series of parallel grooves.

8. A mold assembly for use in a plastic blow molding process, the mold assembly comprising:

a mold cavity shell made by nickel vapour deposition;

the mold cavity shell having a cavity portion including a front face, a rear face and peripheral edge portions, the front face defining a cavity in the shape of a portion of a product to be molded;

the mold cavity shell also having coplanar, peripheral side portions attached to said peripheral edge portions, the side portions defining front surfaces adapted to mate with corresponding surfaces of a mating mold cavity shell to define the product to be molded;

a mold holder located rearwardly of the mold cavity shell;

means for releasably connecting the mold holder to the peripheral side portions;

the mold holder defining an inner wall spaced from the mold cavity portion to define a heat transfer passage between said inner wall and said cavity portion and the mold holder has peripheral parting line portions located outwardly of the mold cavity shell peripheral side portions; and wherein the mold holder peripheral parting line portions have front faces extending slightly forwardly of the mold cavity shell side portion front surfaces.

9. A mold assembly as claimed in claim 8 wherein the front faces extend forwardly a distance of between 0.002 and and 0.003 inches (0.051 and 0.076 millimeters) so that when the mold assembly is mated to a corresponding mating mold assembly, a gap of between 0.004 and 0.006 inches (0.102 and 0.152 millimetres) is present between the mating mold cavity shell side portion front surfaces.

10. A mold assembly for use in a plastic blow molding process, the mold assembly comprising:

a mold cavity shell made by nickel vapour deposition;

the mold cavity shell having a cavity portion including a front face, a rear face and peripheral edge portions, the front face defining a cavity in the shape of a portion of a product to be molded;

the mold cavity shell also having coplanar, peripheral side portions attached to said peripheral edge portions, the side portions defining front surfaces adapted to mate with corresponding surfaces of a mating mold cavity shell to define the product to be molded;

a mold holder located rearwardly of the mold cavity shell;

means for releasably connecting the mold holder to the peripheral side portions;

the mold holder defining an inner wall spaced from the mold cavity portion to define a heat transfer passage between said inner wall and said cavity portion; and wherein the peripheral side portions have locating registering means and the mold holder has corresponding locating registering means adapted to receive the peripheral side portion locating registering means.

11. A mold assembly as claimed in claim 10 wherein the peripheral side portion locating registering means and the mold holder locating registering means are adapted to receive a threaded fastener.

* * * * *